United States Patent [19]
Stadler

[11] Patent Number: 5,172,094
[45] Date of Patent: Dec. 15, 1992

[54] AUTOMATICALLY ARMED VEHICLE ANTI-THEFT SYSTEM

[76] Inventor: David M. Stadler, 15940 Lauderdale, Birmingham, Mich. 48025

[21] Appl. No.: 801,701

[22] Filed: Dec. 2, 1991

[51] Int. Cl.$^5$ .............................. B60R 25/10
[52] U.S. Cl. ................... 340/426; 340/430; 340/527; 340/528; 307/10.2
[58] Field of Search .............. 340/426, 430, 527, 528; 307/9.1, 10.1, 10.2

[56] References Cited

U.S. PATENT DOCUMENTS

| | | | |
|---|---|---|---|
| 3,978,478 | 8/1976 | Schmitz | 340/528 |
| 4,754,255 | 6/1988 | Saunders et al. | 340/528 |
| 4,794,368 | 12/1988 | Grossheim et al. | 340/527 |
| 4,835,518 | 5/1989 | Hwang | 340/527 |

*Primary Examiner*—Donnie L. Crosland
*Attorney, Agent, or Firm*—Lyon & Delevie

[57] ABSTRACT

A motorized vehicle anti-theft system which is passive by being automatically armed (i.e., does not require a vehicle occupant to set the system). Once power has been turned on to the vehicle, detection of an attempt to start the vehicle motor or the opening of a vehicle door (514) starts a predetermined time cycle (518). If a first reset signal is not received before the end of the time cycle, a vehicle disabling circuit is set (524). After that, a detection of actuation of the vehicle brake (526) will cause the disabling circuit to disable the vehicle (530) and set off an alarm (532). Only proper generation of the first and a second reset signal will allow the vehicle to be enabled again.

17 Claims, 5 Drawing Sheets

FIG. 1.

AUTOMATICALLY ARMED VEHICLE ANTI-THEFT SYSTEM

BACKGROUND OF THE INVENTION

The present invention generally relates to theft prevention systems and more specifically to a system for preventing the theft of motor vehicles.

Automobile theft has been a fact of life throughout the history of the automobile. Heretofore, most thefts have occurred when the automobile is parked and unoccupied.

A recent phenomenon however, is theft of an automobile from an occupant, at gunpoint. A solution to the automobile theft problem must address this new dimension of car theft. Conventionally, anti-theft systems require an occupant to arm or set the system before a theft can be deterred.

SUMMARY OF THE INVENTION

The present invention solves the above stated problem by providing a vehicle anti-theft system in which actuation of the system does not require any action by an occupant of the vehicle. A basic premise underlying the concept of the present invention is that an occupant is under extreme duress when approached by a thief and therefore incapable or ill advised to perform a physical act to activate an anti-theft system. In accordance with the present invention, the anti-theft system is automatically armed at the end of a predetermined time period if an occupant does not properly deactivate (reset) the system. Once the anti-theft system is armed, the vehicle will become disabled upon actuation of the brake pedal. Once the vehicle has become disabled, only proper resetting of both the vehicle disabling circuitry and the anti-theft system will deactivate (reset) the entire system so the vehicle can again be operated normally.

It is therefore an object of the present invention to provide an improved vehicle anti-theft system. The present invention provides an automatically armed motorized vehicle anti-theft system comprising a sensor latch means for providing an output signal in response to detection of either an attempt to start the vehicle motor or the opening of a vehicle door, and a timer means having a timer cycle, said timer means being responsive to detection of vehicle power activation and to said sensor latch means output signal for automatically starting said timer cycle, wherein when said timer cycle is complete, said timer means outputs a trigger signal. A first manually actuated reset signal generating means generates a first reset signal to reset said sensor latch means and said timer means, and a vehicle disabling means which is responsive to said trigger signal for disabling said vehicle upon detection of vehicle brake activation after the receipt of said trigger signal. A second manually actuated reset signal generating means generates a second reset signal to reset said vehicle disabling means, wherein after said vehicle is disabled, said motorized vehicle anti-theft system can only be reset and the vehicle enabled again by the actuation of both said first and said second reset signal generating means.

It is a further object of the present invention to provide a first manually actuated reset signal generating means as either a concealed switch means or a voice/-speech recognition means.

It is a further object of the present invention to provide a method of passively preventing a theft of a motorized vehicle comprising detecting power activation of the vehicle, and detecting an attempt to start the vehicle motor or open a vehicle door. In response to the detection of both the activation of vehicle power and one of either an attempt to start the motor or open a door, the system automatically initiates a predetermined time cycle. The system then detects whether a first reset signal is generated, and if it is not, generates a trigger signal at the end of said time cycle if no first reset signal is received. The system further detects the actuation of said vehicle brake, and disables said vehicle in response to the first detection of vehicle brake actuation after said trigger signal has been generated. A detection of whether a second reset signal is generated is made after said vehicle is disabled and in response to the generation of said second reset signal, restarting said time cycle, detecting the actuation of the brake, and disabling the vehicle again, wherein once the vehicle is disabled, it can only be enabled again after proper generation of both said first and said second reset signals.

These and other objects and advantages of the present invention will become more apparent upon reading the following detailed description of the preferred embodiments in conjunction with the accompanying drawings.

BRIEF DESCRIPTION OF THE DRAWINGS

FIG. 3 is a detailed electrical schematic of a second embodiment of the system according to the present invention;

DETAILED DESCRIPTION OF THE PREFERRED EMBODIMENT OF THE INVENTION

Figure 1:
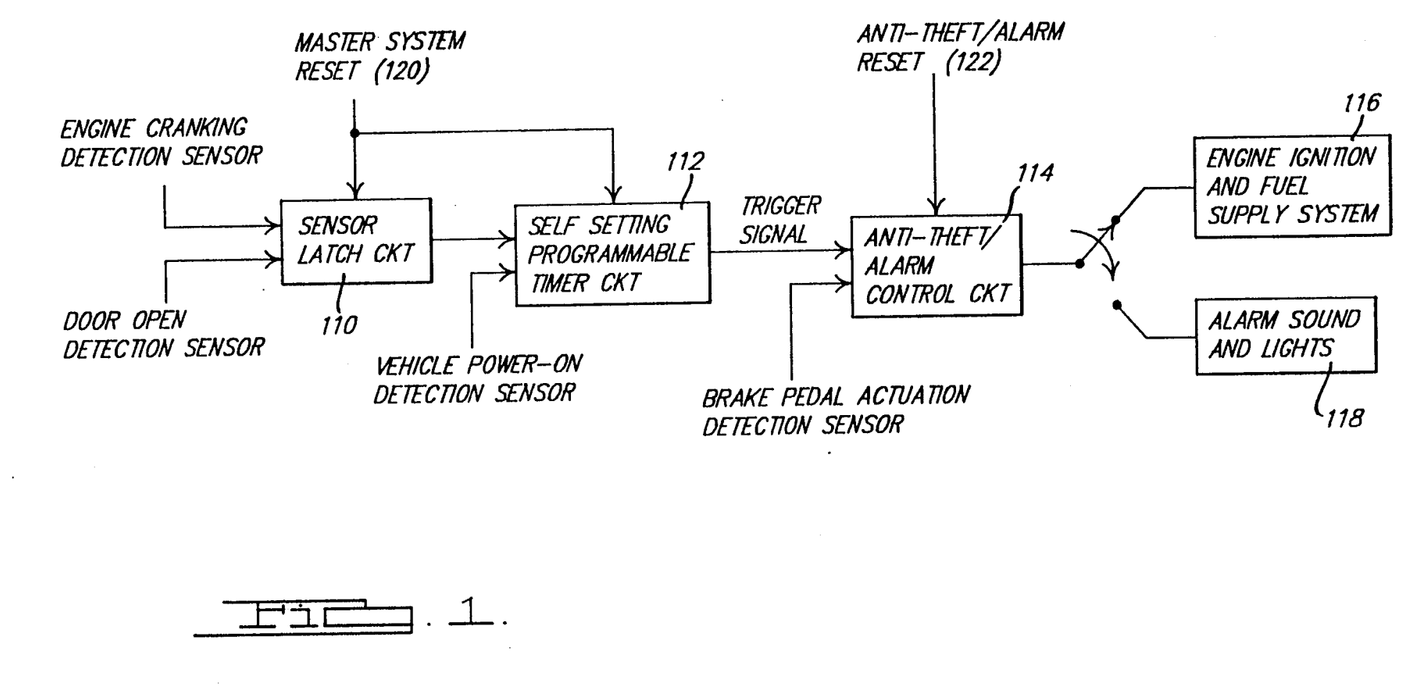
FIG. 1 is a block diagram of the automatically set vehicle anti-theft system according to the present invention.

Referring to FIG. 1 there is shown a general block diagram of the present vehicle anti-theft system. The self-setting programmable timer circuitry (112) represents the central element of the present invention. In operation, timer circuitry (112) is automatically set when vehicle power is activated (for example, by way of an ignition key). Once the timer circuitry is set, an input signal to timer circuitry (112) from either an engine cranking detection sensor or a door open detection sensor via sensor latch circuitry (110) will start the timer cycle. The timer cycle can be set for any desired length of time. In the preferred embodiment, the timer cycle can be programmed to run from 30 seconds to 60 seconds.

When the timer circuitry (112) begins its timer cycle, only an input signal from a master system reset (120) can properly deactivate the timer circuitry (112). The generation of the master system reset (120) requires a particular physical action from an occupant in the vehicle. If no master system reset signal is received, the timer circuitry will continue the timer cycle. If vehicular power is deactivated and subsequently reactivated (for example, by way of an ignition key), the timer (112)

automatically restarts the timer cycle so that merely deactivating vehicle power will not deactivate (reset) the system.

Once the timer circuitry (112) completes its timer cycle, a signal is output to set an anti-theft/alarm control circuitry (114). After being set, the control circuitry (114) is triggered by the next input signal received from a brake pedal actuation sensor. In accordance with the present invention, electrical current will always pass through control circuitry (114) to a vehicle's ignition coil/fuel pump (116) and a brake light during normal vehicle operation. When the control circuitry (114) is triggered due to brake pedal actuation, it then switches power off to both the engine ignition system (e.g. the ignition coil(s)) and the fuel supply system (e.g. the fuel pump) (116) while activating alarm sounds and lights (118).

With the present invention, the anti-theft/alarm control circuitry (114) can only be reset by way of an anti-theft/alarm reset signal (122). In the present invention, the reset signal (122) is preferably a personal security code input via a keyboard. Central to the operation of the system is that once the control circuit (114) is triggered, the anti-theft system is placed into a "doomsday" mode. Deactivating vehicle power will not deactivate the anti-theft system. If vehicle power were reactivated, the alarm would still be activated and the timer circuitry (112) would automatically restart the timer cycle. In this way even if a thief were to somehow generate the reset signal (122), the timer circuitry (112) would again complete its time cycle so that the control circuit (114) would again be triggered by the next actuation of the brake pedal. Once the system has been triggered, only proper generation of both the anti-theft/alarm reset signal (122) and the master system reset signal (120) can deactivate the anti-theft system according to the present invention.

Figure 2:
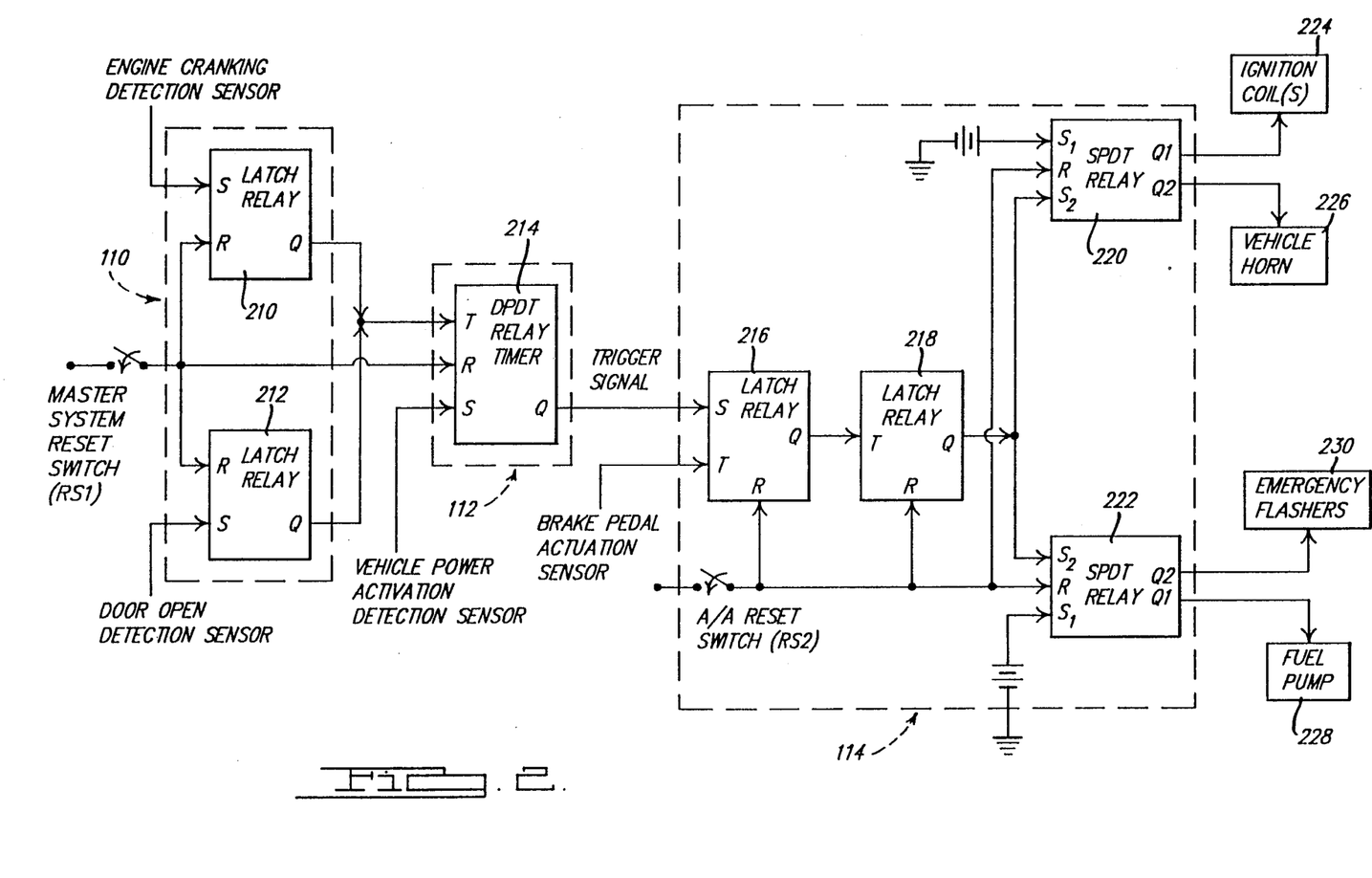
FIG. 2 is a detailed electrical schematic of a first embodiment of the system according to the present invention.

Referring now to FIG. 2 there is shown a circuit diagram for a first embodiment of the anti-theft system according to the present invention. Sensor latch circuitry (110) is comprised of two latch relay units (210) and (212). Latch relay (210) is responsive to an input signal from an engine cranking detection sensor (such as a sensor which detects movement of an ignition key from an instrumentation power mode to an engine ignition mode), and latch relay (212) is responsive to an input signal from an open door detection sensor.

Outputs Q from both latch relays (210) and (212) are connected to a trigger input (T) of a double-pole/double-throw (DPDT) relay timer unit (214). The timer unit (214) constitutes timer circuitry (112) and has a programmable timer cycle. Timer unit (214) is automatically set when a power-on detection signal is received at an (S) input. Timer unit (214) and latch relays (210) and (212) can only be reset if a master reset switch (RS1) is actuated. In the preferred embodiment, the switch (RS1) would be disguised, concealed or hidden somewhere within the vehicle.

Anti-theft/alarm control circuitry is comprised of two latch relay units (216) and (218) and two single-pole/double-throw (SPDT) relay units (220) and (222). When timer unit (214) times out, it provides an output Q to a set input on latch relay (216). Once latch relay (216) is set, any input signal from a brake pedal actuation sensor at (T) will cause latch relay (216) to output a signal at (Q) to trigger latch relay (218) at an input (T). When latch relay (218) is triggered, it provides an output at Q.

Output (Q) of latch relay (218) is connected to both an input ($S_2$) of SPDT relay (220) and an input ($S_2$) of SPDT relay (222). Inputs ($S_1$) of both SPDT relays (220) and (222) are connected to the vehicle power source. In normal vehicle operation, electrical current flows through SPDT relay (220) from ($S_1$) to ($Q_1$) allowing the vehicle ignition system coil(s) to operate. The same is true with SPDT relay (222) and the vehicle fuel pump (228).

SPDT relay (220) acts as a switch such that when an output signal from latch relay (218) is received at ($S_2$), SPDT relay (220) disconnects power to the ignition coil(s) (224) and connects it to the vehicle horn (226) via output ($Q_2$). SPDT relay (222) operates identically with the vehicle fuel pump (228) and the vehicle's emergency flashers (230). It will be appreciated that a special alarm horn and flasher could be used in place of the vehicle's regular horn and emergency flashers.

Once the anti-theft system has been triggered, latch relays (216)/(218) and SPDT relays (220)/(222) can only be reset by actuation of an anti-theft/alarm reset switch (RS2). In the preferred embodiment, switch (RS2) is implemented by using a special security code input by way of a keyboard. It will be appreciated that switch (RS2) can also be implemented by using a concealed or hidden switch.

In a preferred implementation of the circuit shown in FIG. 2, the following commercially available circuit elements or equivalents can be used: for latch relays (210), (212), (216) and (218) a Potter & Brumfield T83 series DPDT dual coil latching PC board relay; for SPDT relays (220) and (222) a Potter & Brumfield T91 series SPDT spring biased 30 amp panel mount relay; and for DPDT relay timer (214) a Potter & Brumfield CD series CMOS IC time delay relay.

In accordance with a central concept of the present invention, timer unit (214) automatically sets itself and is triggered to start its timer cycle whenever it receives a signal from latch relay (210) or (212). Once the timer cycle is started, the timer unit (214) can only be deactivated (reset) by the receipt of the master system reset signal from switch (RS1). Removing power from timer unit (214) without resetting latch relay (210) or (212) will only keep restarting the timer cycle whenever the system subsequently detects power reactivation.

It is also noted that once the vehicle becomes disabled by the present invention, it can only be enabled and operated normally after switch (RS2) and (RS1) have been actuated. For example, merely actuating switch (RS2) will not reset the timer unit (214). The next time the brake pedal is depressed, the vehicle will be disabled again.

Referring now to FIG. 3 there is shown a circuit diagram for a second embodiment of the anti-theft system according to the present invention. Elements which are identical to those in FIG. 2 have like numerals, and their operation has been previously described in context with FIG. 2.

The system shown in FIG. 3 has replaced the concealed master system reset switch with a voice recognition microprocessor (VRM) or speech recognition microprocessor (SRM) (310). The present embodiment illustrates a VRM, but an SRM is equally applicable. The VRM (310) provides a more secure yet easier way of deactivating (resetting) the anti-theft system of the present invention. VRM (310) could be set to recognize a single voice or command word, or a plurality of voices and command words. The operation of the circuit shown in FIG. 3 is identical to that in FIG. 2.

In further accordance with the present invention as shown in FIG. 3, SPDT relay (222) activates a small tracking beacon transmitter (312) in addition to the emergency flashers (230). Transmitter (312) transmits a radio beacon signal which can be tracked by a separate tracking receiver (not shown). In this way, the location of the vehicle can be determined after the anti-theft system has been triggered and disabled the vehicle.

Figure 4:
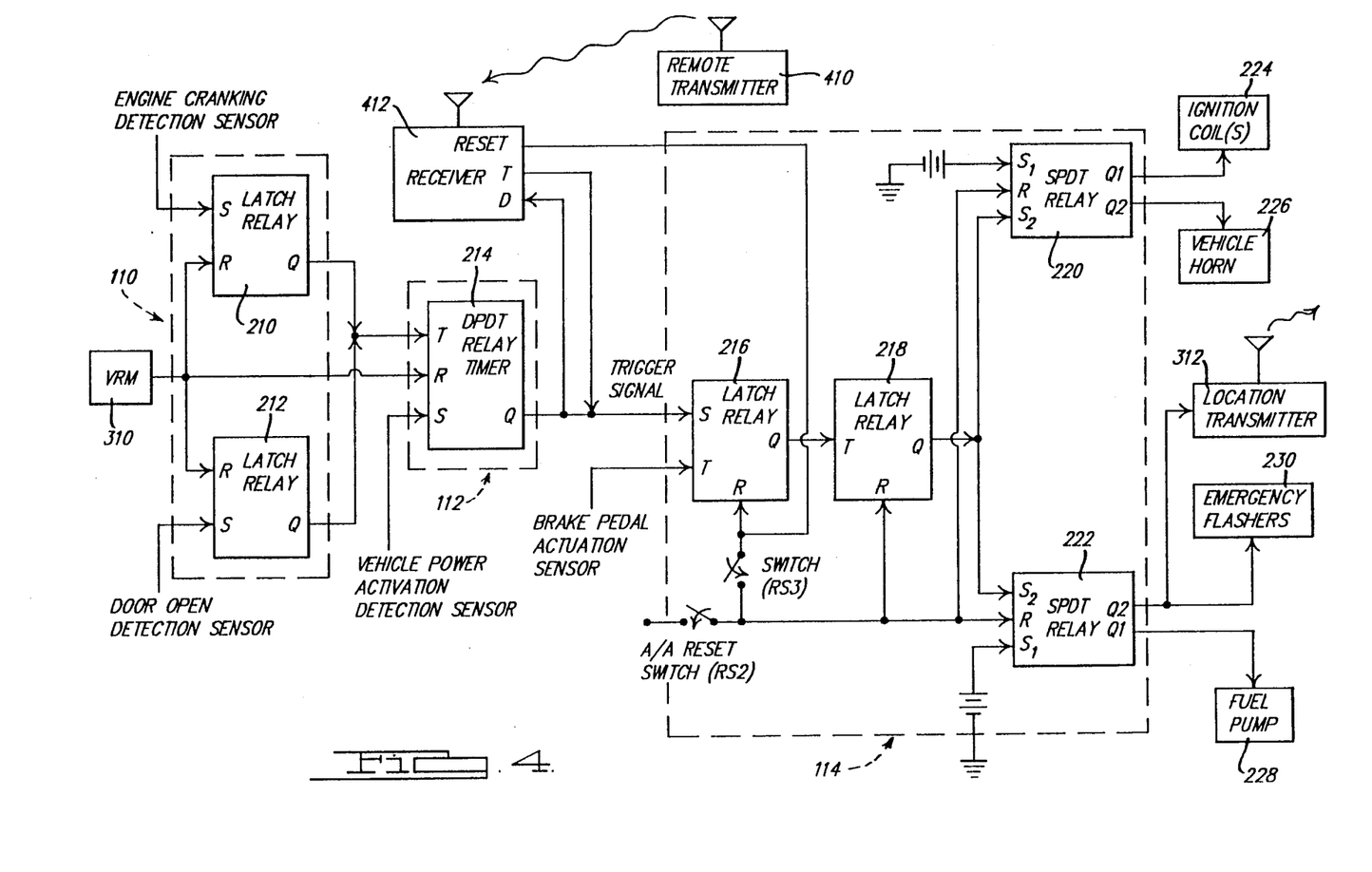
FIG. 4 is a detailed schematic of a third embodiment of the system according to the present invention.

Referring now to FIG. 4 there is shown a circuit diagram for a third embodiment of the present invention. Elements which are identical to those in FIGS. 2 and 3 have like numerals and their operation has been previously described in context with FIGS. 2 and 3.

The system shown in FIG. 4 has added a small activating transmitter (410) and receiver (412). Transmitter (410), for example, can be located on a key chain. With transmitter (410), a person can remotely activate the anti-theft system according to the present invention. Receiver (412) receives an activate signal from transmitter (410) and generates an output signal to (S$_2$) of latch relay (216). In this way, the timer unit (214) is bypassed and the system can be immediately set. The receiver (412) also receives a deactivate signal and generates a reset signal to reset latch relay (216). This embodiment would be particularly suited to an armored car. Guards outside the vehicle could then activate the anti-theft system via transmitter (410) immediately upon occurrence of a theft. A transmitter/receiver could be selected to provide a reception range of up to 500 feet.

In the operation of the circuit of FIG. 4, the present invention further provides for the output (Q) of timer unit (214) to disable receiver (412) via input D in addition to setting latch relay (216). In this way, when the timer cycle has completed, receiver (412) will not be able to reset latch relay (216) because it can not receive any transmissions until the entire system is reset.

Also note the use of switch (RS3) located between the reset of latch relay (216) and the reset of latch relay (218). The switch (RS3) prevents receiver (412) from ever being able to reset latch (218) unless closed. In this way, an unauthorized user cannot deactivate the anti-theft system by means of remote transmitter (410) before the timer (214) can disable the receiver (412). Latch relay (216) can only be reset by the simultaneous activation of switch (RS2) and switch (RS3) after the timer cycle has completed. Switch (RS3) could be disguised or concealed in the vehicle.

Figure 5:
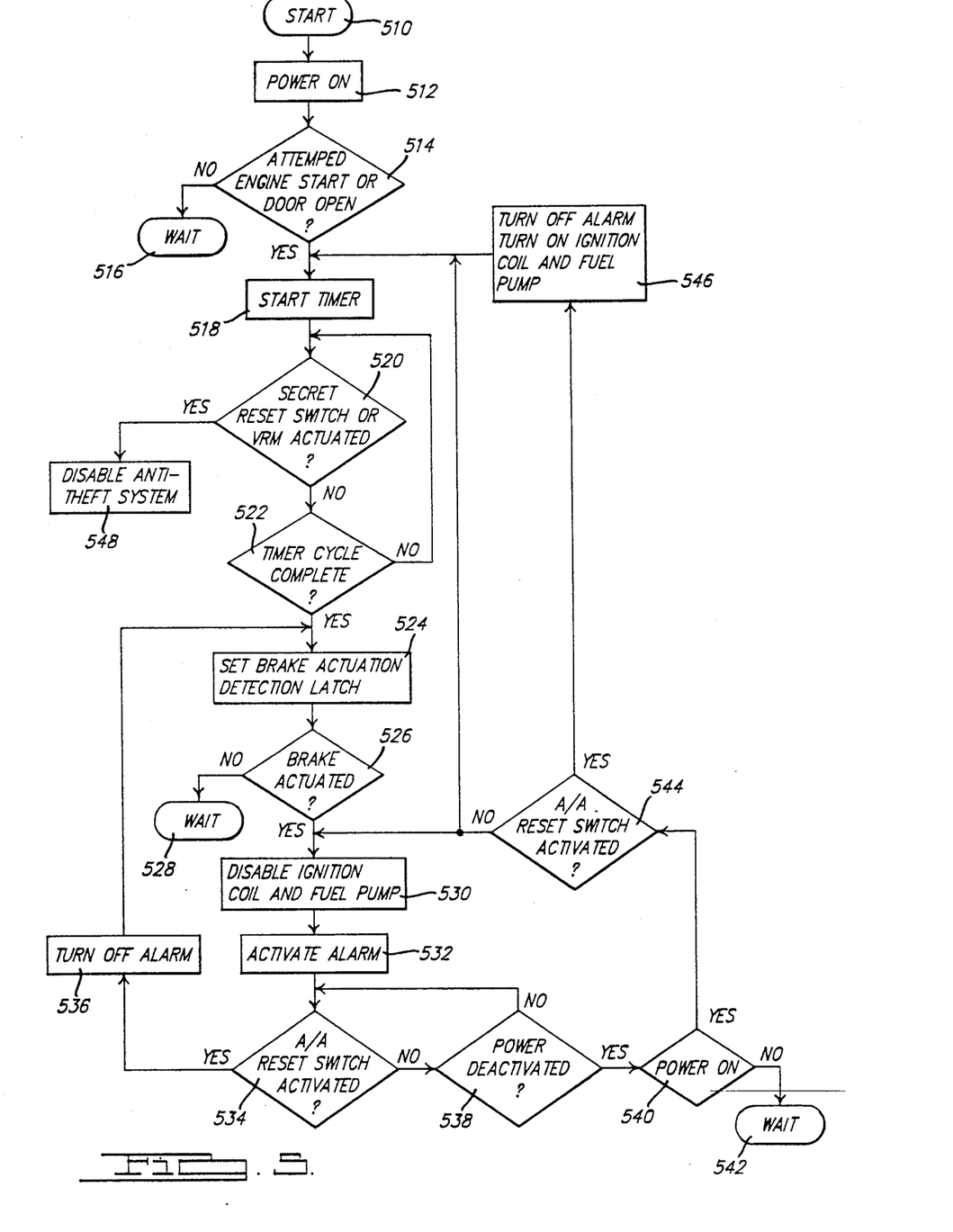
FIG. 5 is a flow chart illustrating the operation of the system according to the present invention.

Referring now to FIG. 5 there is shown a flow chart illustrating the basic operation of the anti-theft system according to the present invention. First, the system determines that power has been turned on in the vehicle (512). Once power is turned on, the system determines if there is an attempt to start the engine, or a door is opened (514). If there is no detection, the system waits (516). If there is a detection, the system will automatically start the timer (518).

Once the timer is started, the system will determine if the master system reset switch or VRM have been properly actuated. If so, the anti-theft system is deactivated or disabled (548). If not, the system checks to see if the timer cycle has been completed (522). If not, the system will keep checking for proper receipt of the master system reset signal.

Once the timer cycle is complete, the system will set the brake pedal actuation detection latch (524). If there is detection of brake pedal actuation, the system then disables the vehicle ignition system and fuel supply system (530) and then actuates an alarm (532). If not, the system just waits (528).

Once the alarm is actuated, the system then determines if the anti-theft/alarm system reset switch has been actuated (534). If so, the system turns off the alarm/turns on the fuel supply system and ignition system (536) but resets the brake pedal actuation detection latch (524). If the anti-theft/alarm system reset switch has been actuated, the system determines if vehicle power has been deactivated (538). If not, the car remains disabled with the system continuously checking for the anti-theft/alarm system reset signal.

If power is deactivated, the system then determines if power is reactivated (540). If not, the system just waits (542). If power is reactivated, then the system determines if the anti-theft/alarm system reset switch has been actuated (544). If not, the motorized vehicle remains disabled with the alarm actuated (530 and 532). The system also restarts the timer (518).

If the anti-theft/alarm system reset switch has been actuated, the system then turns off the alarm/turns on the fuel supply system and ignition system (546) and restarts the timer (518). The whole process is continually repeated until the master system reset switch or VRM are properly actuated.

It will be understood that the foregoing description of the preferred embodiments of the present invention is for illustrative purposes only, and that the various structural and operational features herein disclosed are susceptible to a number of modifications and changes none of which departs from the spirit and scope of the present invention as defined in the appended claims.

I claim:

1. An automatically armed motorized vehicle anti-theft system comprising:
    a sensor latch means for providing an output signal in response to detection of either an attempt to start the vehicle motor or the opening of a vehicle door;
    a timer means having a timer cycle, said timer means being responsive to detection of vehicle power activation and to said sensor latch means output signal for automatically starting said timer cycle, wherein when said timer cycle is complete, said timer means outputs a trigger signal;
    a first manually actuated reset signal generating means for generating a first reset signal to reset said sensor latch means and said timer means;
    a vehicle disabling means which is responsive to said trigger signal, said vehicle disabling means disabling said vehicle upon detection of a vehicle brake actuation after the receipt of said trigger signal; and,
    a second manually actuated reset signal generating means for generating a second reset signal to reset said vehicle disabling means, wherein after said vehicle is disabled, said anti-theft system can only be reset and the vehicle enabled again by the actuation of both said first and said second reset signal generating means.

2. An automatically armed motorized vehicle anti-theft system as claimed in claim 1 wherein only said first reset signal prevents the generating of said trigger signal when received by said timer means before completion of said timer cycle.

3. An automatically armed motorized vehicle anti-theft system as claimed in claim 1 wherein said vehicle disabling means further actuates an alarm means when said vehicle is disabled.

4. An automatically armed motorized vehicle anti-theft system as claimed in claim 1 wherein said first manually actuated reset signal generating means comprises a switch means concealed inside the vehicle.

5. An automatically armed motorized vehicle anti-theft system as claimed in claim wherein said first manually actuated reset signal generating means comprises a voice or speech recognition means which generates said first reset signal in response to detecting an authorized voice or speech input.

6. An automatically armed motorized vehicle anti-theft system as claimed in claim wherein said second manually actuated reset signal generating means comprises a switch means concealed inside the vehicle.

7. An automatically armed motorized vehicle anti-theft system as claimed in claim wherein said second manually actuated reset signal generating means comprises a security input means for generating said second reset signal when a proper security code is input.

8. An automatically armed motorized vehicle anti-theft system as claimed in claim 1 wherein said vehicle disabling means further actuates a location tracking transmitter means when said vehicle is disabled so that the location of said disabled vehicle can be determined.

9. An automatically armed motorized vehicle anti-theft system as claimed in claim wherein said system further comprises a receiver means for also generating said trigger signal upon receipt of a remotely transmitted signal, and wherein said trigger signal output by said timer means deactivates said receiver means.

10. A method for passively preventing a theft of a motorized vehicle comprising:
   a) detecting power activation of the vehicle;
   b) detecting an attempt to start the vehicle motor or open a vehicle door;
   c) in response to both steps a) and b), automatically initiating a predetermined time cycle;
   d) detecting whether a first reset signal is generated;
   e) generating a trigger signal at the end of said time cycle if no first reset signal is generated;
   f) detecting actuation of said vehicle brake;
   g) disabling said vehicle in response to the first detection of vehicle brake actuation after said trigger signal has been generated;
   h) detecting whether a second reset signal is generated after said vehicle is disabled, and in response to the generation of said second reset signal, restarting said time cycle and repeating steps f) and g);
wherein once the vehicle is disabled, it can only be enabled again after generation of both said first and said second reset signals.

11. A method for passively preventing a theft of a motorized vehicle as claimed in claim 10 wherein step g) further includes actuating an alarm means when said vehicle is disabled.

12. A method for passively preventing a theft of a motorized vehicle as claimed in claim 10 wherein only the generation of said first reset signal presents the generation of said trigger signal if detected before the end of said time cycle.

13. A method for passively preventing a theft of a motorized vehicle as claimed in claim 10 wherein said first reset signal is generated by a concealed switch means.

14. A method for passively preventing a theft of a motorized vehicle as claimed in claim 10 wherein said first reset signal is generated by a voice or speech recognition means.

15. A method for passively preventing a theft of a motorized vehicle as claimed in claim 10 wherein said second reset signal is generated by a concealed switch means.

16. A method for passively preventing a theft of a motorized vehicle as claimed in claim 10 wherein said second reset signal is generated by a security input means when a proper security code is input.

17. An automatically armed motorized vehicle anti-theft system comprising:
   a first latch means having an input for receiving a signal indicative of an attempt to start the vehicle motor and an output for generating a signal in response to receipt of an input signal;
   a second latch means having an input for receiving a signal indicative of a vehicle door opening and an output for generating a signal in response to receipt of an input signal;
   a double-pole/double-throw relay timer means having a programmable timer cycle, said timer means having a first input for receiving a signal indicative of activation of vehicle power, a second input for receiving both said output signals from said first and said second latch means, and an output for generating a trigger signal at the end of said time cycle, wherein said timer means automatically starts said time cycle in response to receipt of signals at both said first and said second timer inputs;
   a first manually actuated reset signal generating means for generating a first reset signal to reset said first latch means, said second latch means and said timer means;
   a third latch means having a first input for receiving a signal indicative of an actuation of the vehicle brake, a second input for receiving said trigger signal, and an output for generating a signal in response to a signal being received at said first input after said trigger signal has been received;
   a fourth latch means having an input for receiving said output signal from said third latch means, and an output for generating an output signal in response to receipt of said third latch means output signal;
   a first single-pole/double-throw relay means having an input for receiving said fourth latch means output, and an output connected either to the vehicle ignition coil means or to a sound generating means, wherein said output is normally connected to said vehicle ignition coil means but is switched to said sound generating means in response to receipt of said fourth latch means output signal;
   a second single-pole/double-throw relay means having an input for receiving said fourth latch means output, and an output connected either to the vehicle fuel pump means or to a light generating means, wherein said output is normally connected to said vehicle fuel pump means but is switched to said light generating means in response to receipt of said fourth latch means output signal; and,
   a second manually actuated reset signal generating means for generating a second reset signal to reset said third latch means, said fourth latch means, said first single-pole/double-throw relay means and said second single-pole/double-throw relay means, wherein when said first and said second single-throw/double-pole relay means outputs have been switched to said sound generating means and said light generating means respectively, said anti-theft system can only be reset after actuation of both said first and said second reset signal generating means.

* * * * *

UNITED STATES PATENT AND TRADEMARK OFFICE
CERTIFICATE OF CORRECTION

PATENT NO. : 5,172,094
DATED : December 15, 1992
INVENTOR(S) : David M. Stadler

It is certified that error appears in the above-identified patent and that said Letters Patent is hereby corrected as shown below:

Col. 7, line 8 (Claim 5), after "in claim" insert --1--.

Col. 7, line 14 (Claim 6), after "in claim" insert --1--.

Col. 7, line 18 (Claim 7), after "in claim" insert --1--.

Col. 7, line 26 (Claim 9), after "in claim" insert --1--.

Col. 7, line 58 (Claim 12), "presents" should be --prevents--.

Signed and Sealed this

Nineteenth Day of October, 1993

Attest:

BRUCE LEHMAN

*Attesting Officer*  *Commissioner of Patents and Trademarks*